United States Patent [19]

Ohmori et al.

[11] Patent Number: 5,625,505
[45] Date of Patent: Apr. 29, 1997

[54] METHOD OF AND APPARATUS FOR REGENERATING PARTIAL-RESPONSE RECORD SIGNAL

[75] Inventors: Hideki Ohmori; Shuichi Hashimoto, both of Kawasaki, Japan

[73] Assignee: Fujitsu Limited, Japan

[21] Appl. No.: 379,866

[22] Filed: Jan. 27, 1995

[30] Foreign Application Priority Data

Feb. 3, 1994 [JP] Japan .................. 6-031836

[51] Int. Cl.$^6$ .................. G11B 5/09; G11B 5/035
[52] U.S. Cl. .................. 360/46; 360/51; 360/65; 375/341; 375/290
[58] Field of Search .................. 360/65, 51, 46; 375/341, 231, 290

[56] References Cited

U.S. PATENT DOCUMENTS

| | | |
|---|---|---|
| 4,644,564 | 2/1987 | Dolivo et al. . |
| 4,707,681 | 11/1987 | Eggenberger et al. . |
| 4,786,890 | 11/1988 | Marcus et al. . |
| 4,888,775 | 12/1989 | Karabed et al. . |
| 5,060,088 | 10/1991 | Dolivo et al. . |
| 5,297,169 | 3/1994 | Backstrom et al. ............ 375/231 |
| 5,420,893 | 5/1995 | Ward ............ 375/368 |
| 5,422,760 | 6/1995 | Abbott et al. ............ 360/65 |

Primary Examiner—Aristotelis Psitos
Assistant Examiner—Regina Y. Neal
Attorney, Agent, or Firm—Greer, Burns & Crain, Ltd.

[57] ABSTRACT

Disclosed are a partial-response record signal regenerating method of and an apparatus for regenerating a record signal of a data area which is read from a storage disc by use of an equalizing circuit after training a circuit constant of said equalizing circuit with a training signal of the record signal read from the storage disc. The record signal regenerating method comprises: a Viterbi decode step of Viterbi-decoding an output into which the record signal is equalized by the equalizing circuit; a decode step of converting an m-bit output which is Viterbi-decoded into n-bits (m>n); and a synchronism detecting step of detecting the training signal from the m-bit output which is Viterbi-decoded and indicating a start of decoding the record signal of the data area. The record signal regenerating apparatus comprises: an equalizing circuit for equalizing the record signal by use of its circuit constant trained by a training signal recorded in front of a data area on the storage disc; a Viterbi decode circuit for Viterbi-decoding an output of the equalizing circuit; a decoder for converting an m-bit output which is Viterbi-decoded into n-bits (m>n); and a synchronism detecting circuit for indicating a start of decoding of the decoder by detecting the training signal from the Viterbi-decoded m-bit output.

9 Claims, 8 Drawing Sheets

METHOD OF AND APPARATUS FOR REGENERATING PARTIAL-RESPONSE RECORD SIGNAL

BACKGROUND OF THE INVENTION

1. Field of the Invention

The present invention relates generally to a partial-response record signal regenerating method and an apparatus thereof that make use of partial-response signaling with a maximum-likelihood sequence detection and, more particularly, to a partial-response record signal regenerating method and an apparatus thereof that improve a process of detecting a start-of-decode position.

2. Description of the Related Art

In recent years, partial-response signaling with maximum-likelihood sequence detection (PRML) has hitherto been utilized in order to enhance recording densities of a magnetic disc and a magneto-optic disc apparatus. In such a PRML system, when data is written to the magnetic disc, the data is coded. For example, 8-bit data is converted into 9-bit data by use of 8/9 conversion codes, and the data is thus written to the magnetic disc. Conversely when reading the data from the magnetic disc, it becomes necessary to decode the data in accordance with the conversion codes and thus set the data back in the original form.

In the case of this decoding, it is required that the coded data be decoded according to every set of data. For instance, in the case of the 8/9 conversion, the data is decoded into 8 bits according to every 9-bit data. Hence, it is necessary to detect a start-of-position for decoding the data.

In the disc storage apparatus which utilizes the partial-response signaling, a maximum-likelihood sequence detector reconstructs a string of data recorded, and, a receiving filter (equalizing circuit) of the regenerating apparatus is required to shape an output signal of a record channel into a partial-response signal. For this purpose, a training signal is written to a storage disc. Then, this training signal is read, and the equalizing circuit such as an electric filter and a cosine equalizer is trained. That is, the equalizing circuit is adapted to a partial-response characteristic corresponding to a track radius on the disc.

Such a system is disclosed in the specifications of U.S. Pat. Nos. 5,060,088, 4,644,564, 4,707,681, 4,786,890 and 4,888,775.

In such a PRML system, an item of synchronous data known as a sync byte is written into a heading of the data. Then, the start-of-decode position is detected beforehand by detecting this sync byte. For example, in the case of a 8/9 conversion, the data is decoded by 9 bits from the start-of-decode position detected using the sync byte.

According to this technique, however, it is required that the sync byte be written into a data area. For this reason, the data area in which the actual data are recorded is reduced. This leads to a problem that the actual data storage capacity decreases.

SUMMARY OF THE INVENTION

It is a primary object of the present invention to provide a partial-response record signal regenerating method of and an apparatus for preventing a reduction in data storage capacity on a disc and, at the same time, detecting a starting point of the decoding.

It is another object of the present invention to provide a partial-response record signal regenerating method of and an apparatus for detecting the starting point of the decoding by a simple method.

It is still another object of the present invention to provide a partial-response record signal regenerating method of and an apparatus for accurately detecting the starting point of the decoding.

To accomplish the above objects, according to one aspect of the present invention, there is provided a partial-response record signal regenerating method comprising: a Viterbi decode step of Viterbi-decoding an output into which the record signal is equalized by the equalizing circuit; a decode step of converting an m-bit output which is Viterbi-decoded into n-bits (m>n); and a synchronism detecting step of detecting the training signal from the m-bit output which is Viterbi-decoded and indicating a start of decoding the record signal of the data area.

According to another aspect of the present invention, there is provided a record signal regenerating apparatus comprising: an equalizing circuit for equalizing the record signal by use of its circuit constant trained by a training signal recorded in front of a data area on the storage disc; a Viterbi decode circuit for Viterbi-decoding an output of the equalizing circuit; a decoder for converting an m-bit output which is Viterbi-decoded into n-bits (m>n); and a synchronism detecting circuit for indicating a start of decoding of the decoder by detecting the training signal from the Viterbi-decoded m-bit output.

According to one aspect of the present invention, the training signal is utilized as a sync byte. That is, the training signal is written to the storage disc in order to adapt the equalizing circuit to the partial-response characteristic corresponding to the track radius on the storage disc. This training signal is written to the heading of the data and can be therefore used as a substitute for the sync byte. Then, the start-of-decode position is detected by detecting this training signal. Hence, the storage disc does not require a special area in which the sync byte is written, thereby making it possible to prevent a reduction in the data capacity.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
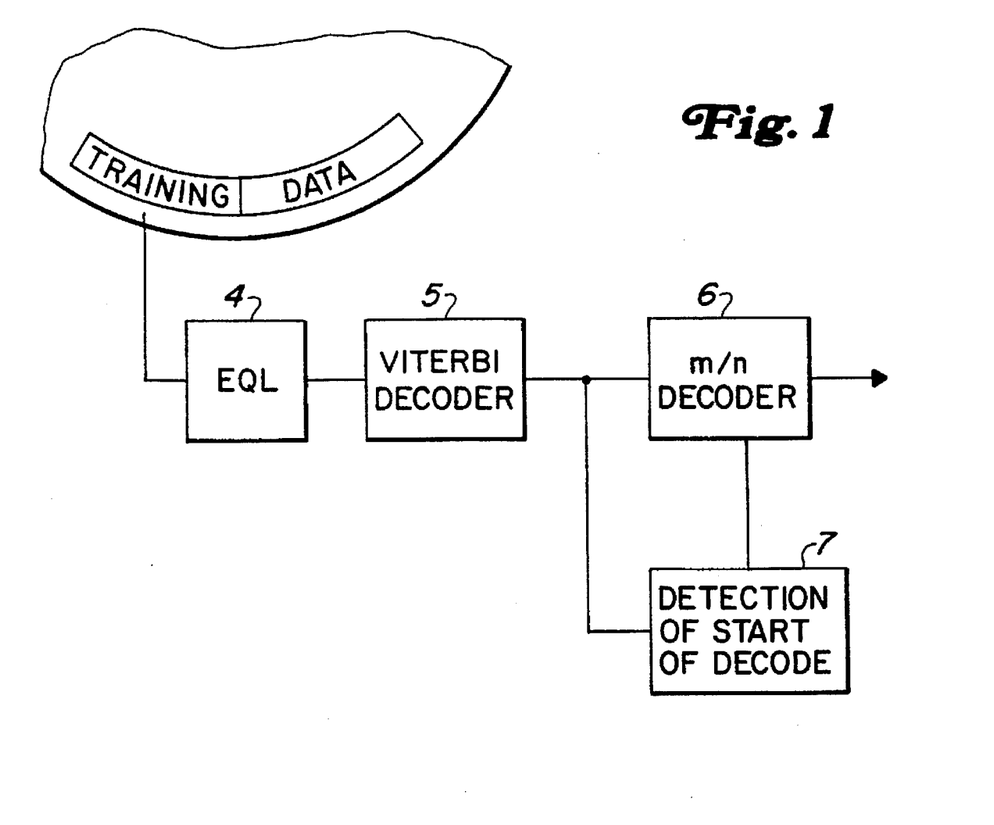
FIG. 1 is a diagram illustrating the principle of the present invention.

FIG. 1 is a diagram illustrating the principle of the present invention.

As illustrated in FIG. 1, a training signal is written in the front of a data area on a magnetic disc. This training signal is employed for adapting a tap coefficient (circuit constant) of an equalizing circuit 4 to a partial-response characteristic. A record signal on the magnetic disc is equalized by the equalizing circuit 4 and thereafter Viterbi-decoded by a Viterbi decoder 5. Thereafter, m-bit record data is decoded into n-bit data by an m/n 6 decoder. A synchronous circuit 7 detects a pattern of the training signal written to the magnetic disc from an output of the Viterbi decoder 5. Then, the synchronous circuit 7 indicates the m/n decoder 6 to start decoding in accordance with a detection of the training signal.

Figure 2:
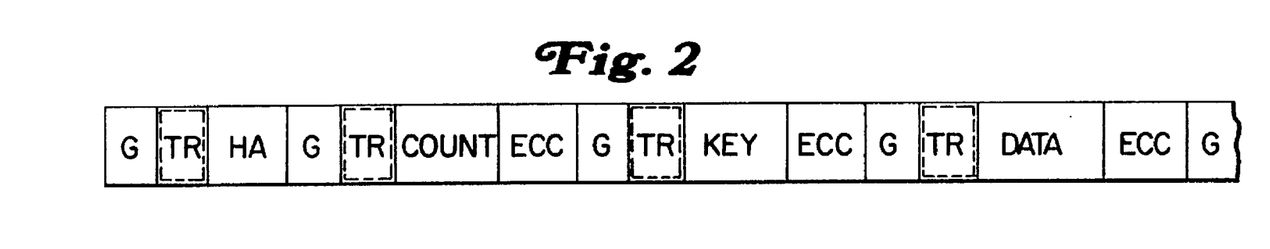
FIG. 2 is an explanatory diagram showing a recording form in one embodiment of the present invention.
Figure 3:
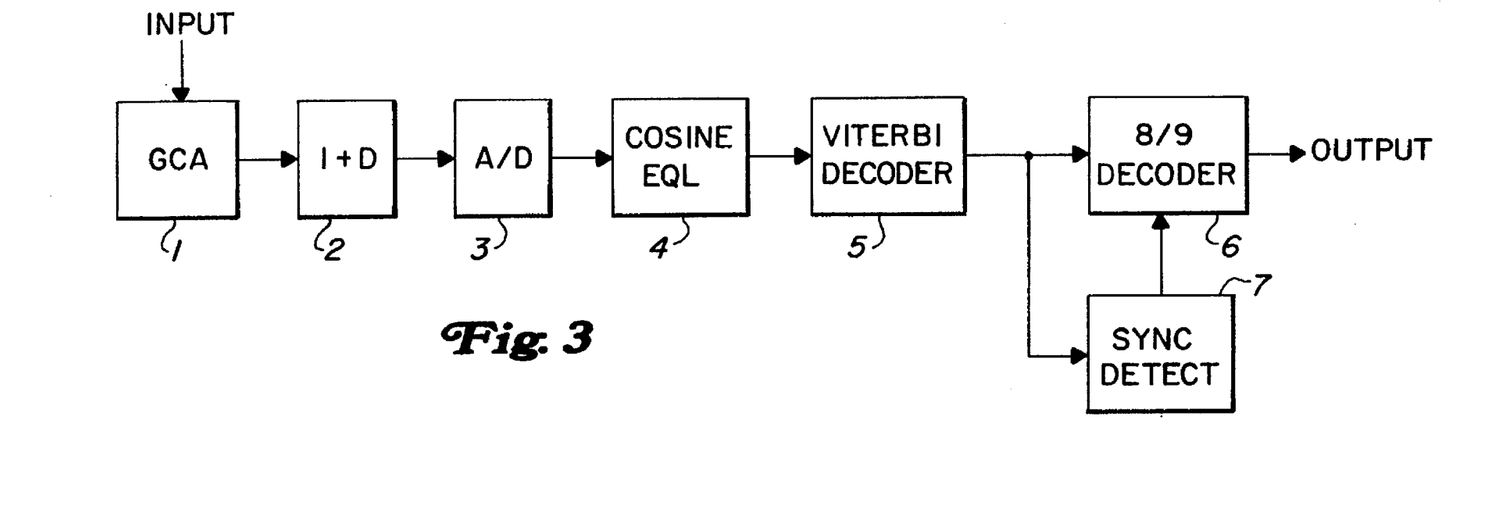
FIG. 3 is a block diagram illustrating a record signal regenerating apparatus in one embodiment of the present invention.

FIG. 2 is an explanatory diagram showing a magnetic record format in one embodiment of the present invention. FIG. 3 is a block diagram illustrating a record signal regenerating apparatus in one embodiment of the present invention.

FIG. 2 illustrates a CKD (Count Key Data) format as a record format on the magnetic disc. As shown in FIG. 2, a training region TR is provided in front of each data area (data area in a broad definition) such as a home address HA, a count part COUNT, a key part KEY and a data part DATA. Note that the symbol G designates a gap.

The training signal is written to this training region TR. In the case of a 8/9 conversion, a plurality of 9-bit training patterns such as [100110011] are consecutively written. This training pattern contains a pattern [001100], and the remaining three bits are [1]. In this embodiment, an explanation will be given on the assumption that five training patterns [111001100] continue.

As shown in FIG. 3, a gain control amplifier 1 imparts a predetermined gain to a from-the-magnetic-disc read signal to be inputted and then outputs the signal. An equalizing filter 2 exhibits a (1+D) characteristic and fixedly equalizes an output of the gain control amplifier 1. An analog-to-digital converter 3 effects sampling of a string of binary data having a signaling speed 1/T at a timing (nT+τ) and outputs a digital sample value Xn.

The cosine equalizer 4 is provided to correct the partial-response characteristic in the radial direction of the disc. The tap coefficient of this cosine equalizer 4 is optimally adjusted by the above training pattern. Then, this type of cosine equalizer 4 is constructed of a known transversal filter disclosed in, e.g., the specification of U.S. Pat. No. 5,060,088.

The Viterbi decoder 5 processes an output sample Yn of the cosine equalizer 4 and reconstructs the record data string. The Viterbi decoder 5, when regenerating a data system recorded to bear a data-to-data correlation, detects a system with the maximum likelihood. A configuration of this Viterbi decoder 5 is also known.

In the data system decoded by the Viterbi decoder 5, 9-bit data is converted into 8-bit data by the 8/9 decoder. This decoder 6 is also known as disclosed in, e.g., the specifications of U.S. Pat. Nos. 4,707,681 and 4,786,890.

A synchronism detection circuit (start-of-decode position detecting circuit) 7 detects a start-of-decode timing of the 8/9 decoder 6 from the data system decoded by the Viterbi decoder 5. This synchronism detection circuit 7 transmits a start-of-decode signal to the 8/9 decoder 6 and controls the start-of-decode timing of the 8/9 decoder 6. This synchronism detection circuit 7 will hereinafter be explained in greater detail with reference to FIG. 4.

Figure 4:
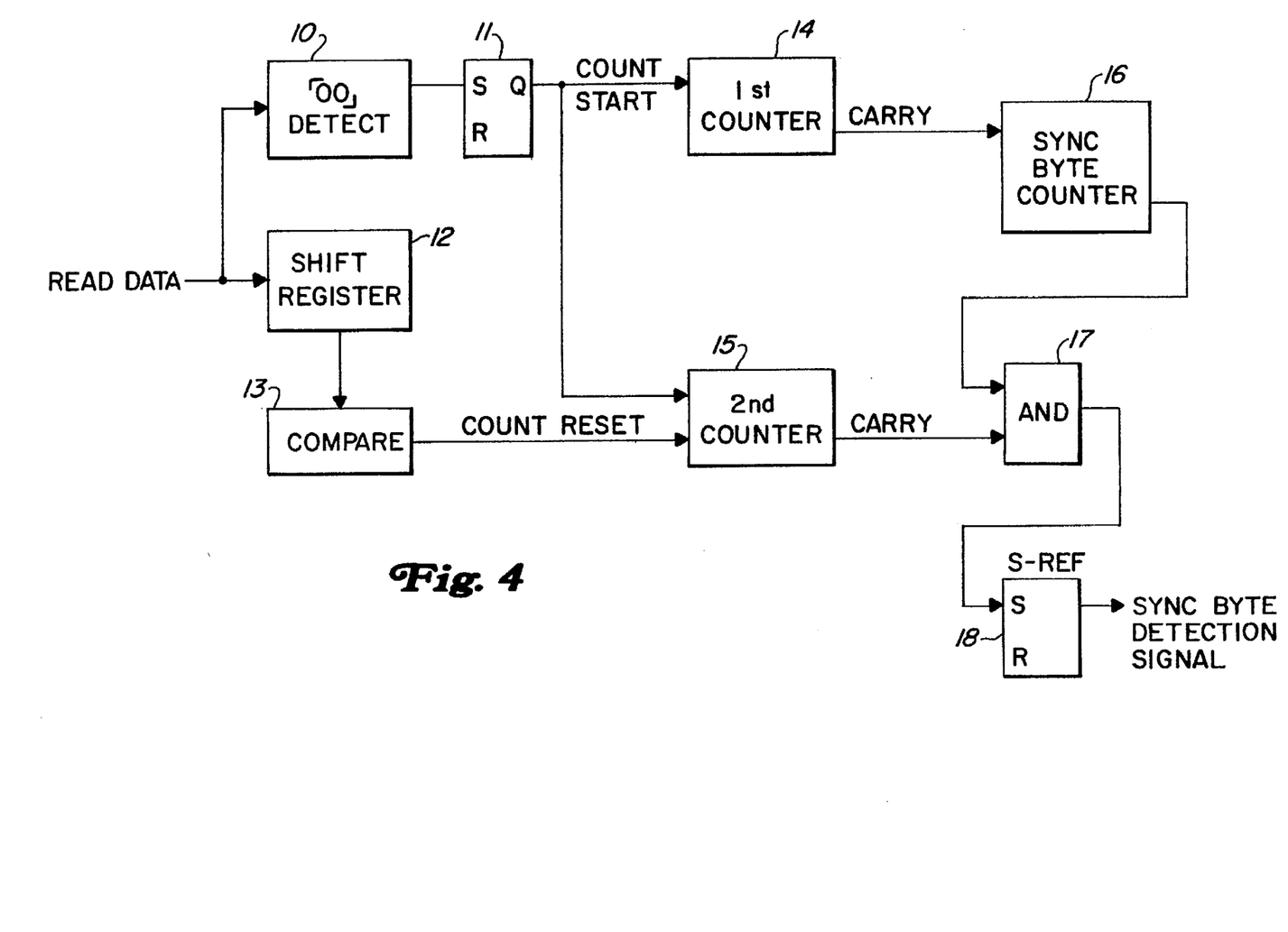
FIG. 4 is a circuit diagram in one embodiment of a synchronism detection circuit of FIG. 3.
Figure 5:
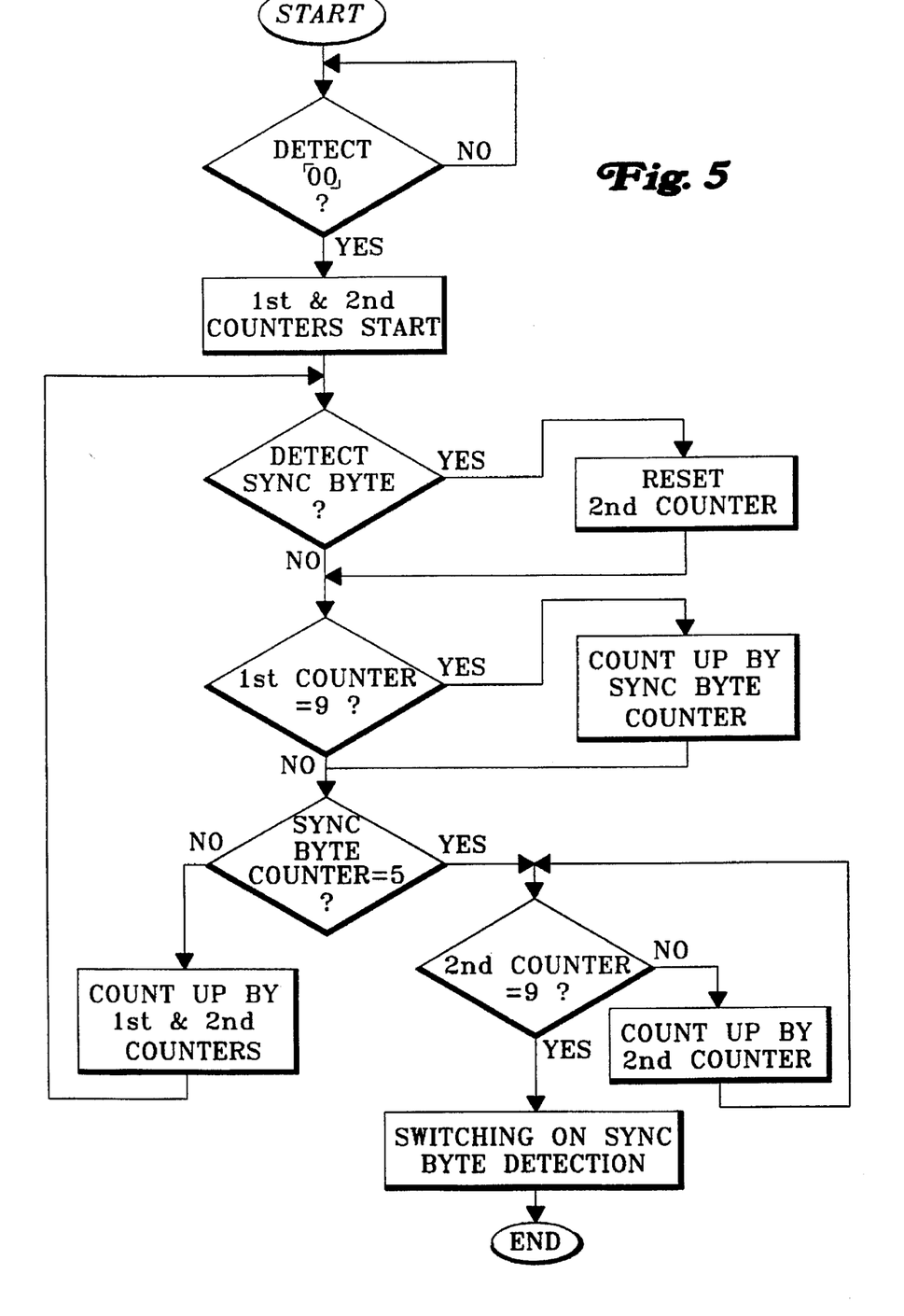
FIG. 5 is a flowchart showing the operation in the construction of FIG. 4.
Figure 6:
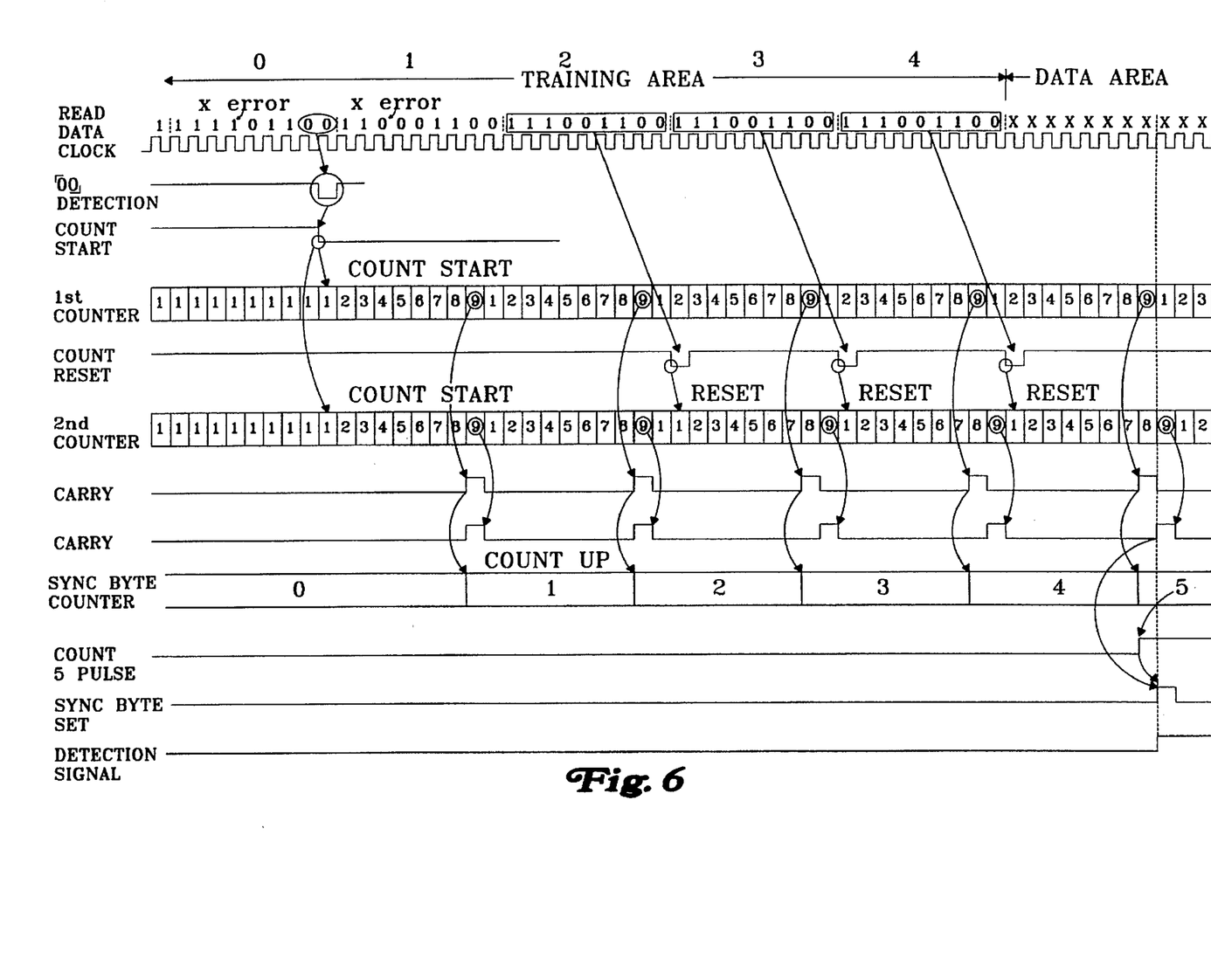
FIG. 6 is a time chart in the construction of FIG. 4.
Figure 7:
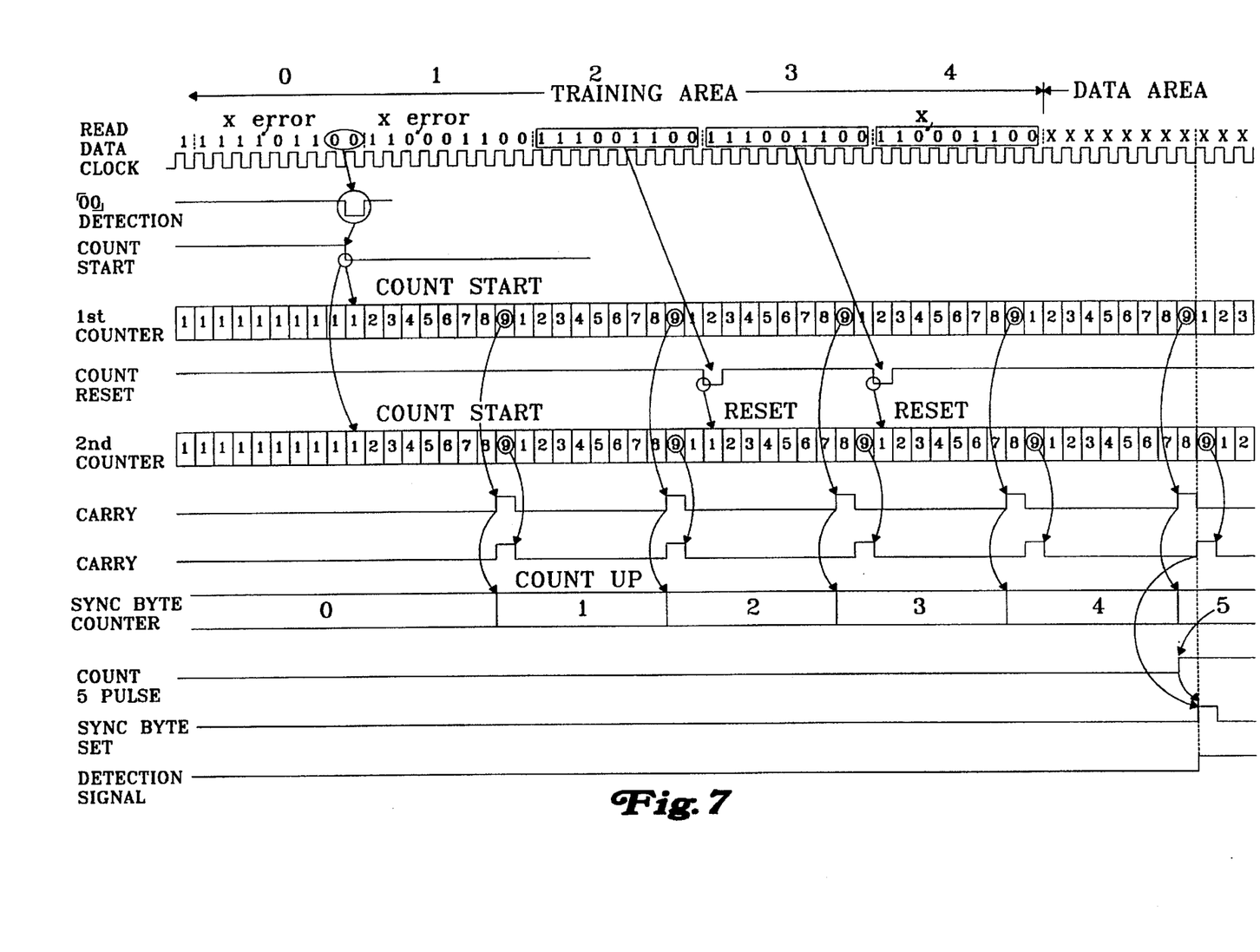
FIG. 7 is another time chart in the construction of FIG. 4.

FIG. 4 is a circuit diagram of the synchronism detection circuit in one embodiment of the present invention. FIG. 5 is a flowchart showing the operation of the circuit in FIG. 4. FIGS. 6 and 7 are time charts of the circuit in FIG. 4.

As illustrated in the circuit diagram of FIG. 4 showing the synchronism detection circuit, a [00] detection circuit 10 detects that the data [0] in read data from the Viterbi decoder 5 continues by two. An S-R flip-flop 11, in which a detection output of the [00] detection circuit 10 is set, generates a counter start signal.

A shift register 12 is constructed of a 9-bit shift register for storing the read data. A compare circuit 13 compares a content of the shift register 12 with a 9-bit training pattern [111001100] utilized as a sync byte. The compare circuit 13, when detecting a comparative coincidence, outputs a counter reset signal to a second counter 15 which will be mentioned later.

A first counter 14 counts clocks synchronizing with the read data by use of the counter start signal. The first counter 14 is constructed of a 9-bit counter. This first counter 14 counts up by 1 each time the read data is inputted bitwise. Then, the first counter 14, when a value becomes [9], outputs a count-9 pulse. Then, the first counter 14, with a next clock input, restarts counting up when the value returns to [1].

The second counter 15 counts the clocks synchronizing with the read data by use of the counter start signal. At the same time, the second counter 15 is reset by a counter reset signal. The second counter 15 is constructed of the 9-bit counter. This second counter 15 counts up by 1 each time the read data is inputted bitwise. Then, the second counter 15, when the value becomes [9], outputs the count-9 pulses. Then, the second counter 15, with the next clock input, restarts counting up when the value returns to [1].

A sync byte counter (a third counter) 16 counts the count-9 pulses of the first counter 14. The sync byte counter 16, when counting [5] defined as the number of training patterns, generates a count-5 pulse. An AND gate 17 ANDs the count-5 pulse of the sync byte counter 16 with the count-9 pulse of the second counter 15 and generates a sync byte detection set signal. An S-R flip-flop 18, to which the sync byte detection set signal is sent, generates a sync byte detection signal (start-of-decode signal).

This sync byte detection signal (start-of-decode signal) is transmitted to the 8/9 decoder 6. With this processing, the 8/9 decoder 6 starts decoding the 9-bit data into the 8-bit data.

Next, the operation of this circuit will be described with reference to FIGS. 5 and 6.

The first and second counters 14, 15 count up by 1 each time the read data is inputted bitwise. When the count value comes to [9], the value returns to [1] with the next clock input, and the first and second counters 14, 15 start counting up. These two counters 14, 15, when detecting such a pattern that the data [0] continues by two in the read data, starts counting from [1] on the assumption that the first training pattern is detected.

The [00] detection circuit 10 detects the pattern in which the data [0] continues by two. The above training pattern has two portions in which the data [0] continues by two, and, hence, even if one of them is not detected due to a data error, the other [00] is detected. Thus, the counters 14, 15 can be started.

The first counter 14, when the count value becomes [9], outputs a carry output. With this outputting, the sync byte counter 16 counts up by one. Accordingly, the sync byte counter 16 counts which number (which cycle) of the training pattern corresponding to the read data.

The second counter 15 is reset each time the compare circuit 13 detects that the training pattern [111001100] enters the shift register 12. The value of the counter 15 thereby becomes [1]. Accordingly, the second counter 15 performs counting in synchronism with the training pattern and takes a timing at which the sync byte detection signal is switched ON.

In the beginning portion of the training area, the tap coefficient of the equalizer 4 is in the course of being optimized, and hence there is a high possibility in which the read data is incorrect. In this embodiment, however, the second counter 15 is synchronized each time a partial pattern in the training pattern is detected. Then, every time the training pattern is detected, the second counter 15 is reset, thus retaking the synchronism. With this process, even if synchronized after detecting the erroneous training pattern in the beginning portion, the synchronism with new data exhibiting a high reliability can be retaken. For this reason, it is possible to take a timing at which the sync byte detection signal is accurately switched ON.

Then, the AND circuit 17 ANDs the count-9 pulse of the second counter 15 taking the synchronism with this training pattern with the count-5 pulse of the sync byte counter 16. The sync byte detection set signal synchronizing with the last training pattern is thereby generated. Then, the sync byte detection signal is switched ON by setting the flip-flop 18.

FIG. 6 is a time chart when an error is seen in the first two training patterns among the five consecutive training patterns. Thus, if an error exist, the data [00] is detected, and counting by the first and second counters 14, 15 is started. The count-9 pulses of the first counter 14 are counted by the sync byte counter 16, thereby detecting a frame position of the training pattern.

On the other hand, the second counter 15 is, upon detecting the data [00], started and, besides, reset with the detection of the training pattern. Therefore, the second counter 15 is modified by outputting of the count-9 pulse synchronizing with the training pattern.

At the time of detecting the last frame of the training pattern of this sync byte counter 16, the count-9 pulse of the second counter 15 is outputted which synchronizes with the second counter 15. The sync byte reset signal can be thereby generated in a 9th bit position from the beginning of the data area. With this processing, from the flip-flop 18, a sync byte is detection signal is generated which is switched ON at the 9th bit from the beginning of the data area.

The 8/9 decoder 6 thereby starts converting the 9-bit data into the 8-bit data.

FIG. 7 is a time chart when an error is seen in the last training pattern in addition to the case of FIG. 6. As described above, even if not synchronized due to the occurrence of the error in the last training pattern, the second counter 15 takes the synchronism in a training pattern disposed one before. For this reason, as in the same way with FIG. 6, the sync byte set signal can be generated in the 9th bit position from the beginning of the data area. That is, the sync byte detection can be generated in synchronism with the most reliable pattern detected latest among the detected training patterns.

In this way, the training pattern is utilized as a sync byte, and, therefore, the start-of-decode timing can be detected without specifically providing the sync bytes. Further, the detection with a high reliability can be performed because of synchronizing with the last training pattern. Moreover, the detection signal synchronizing with the training pattern is generated by detecting the last frame of the training pattern, and the accurate detection can be therefore carried out.

Figure 8:
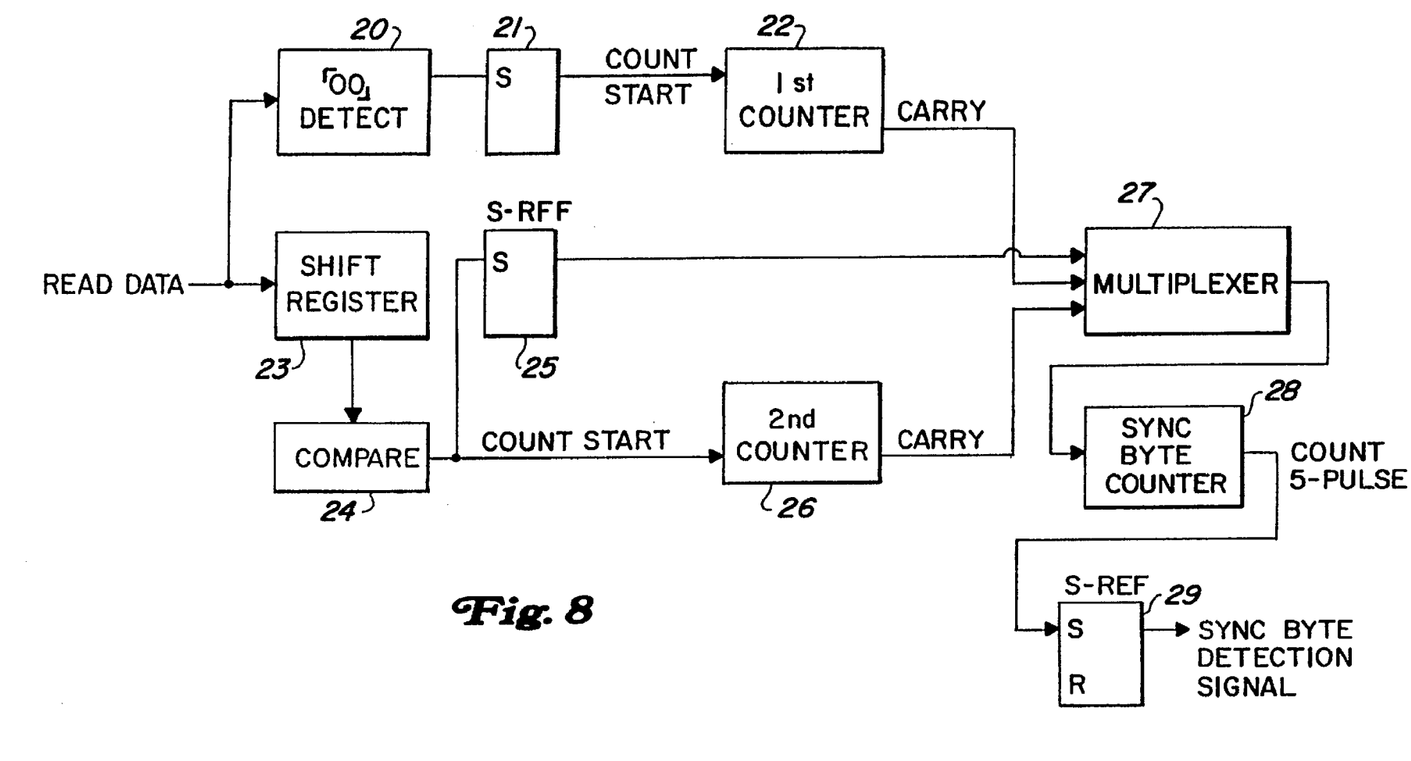
FIG. 8 is a circuit diagram in another embodiment of the synchronism detection circuit of FIG. 3.
Figure 9:
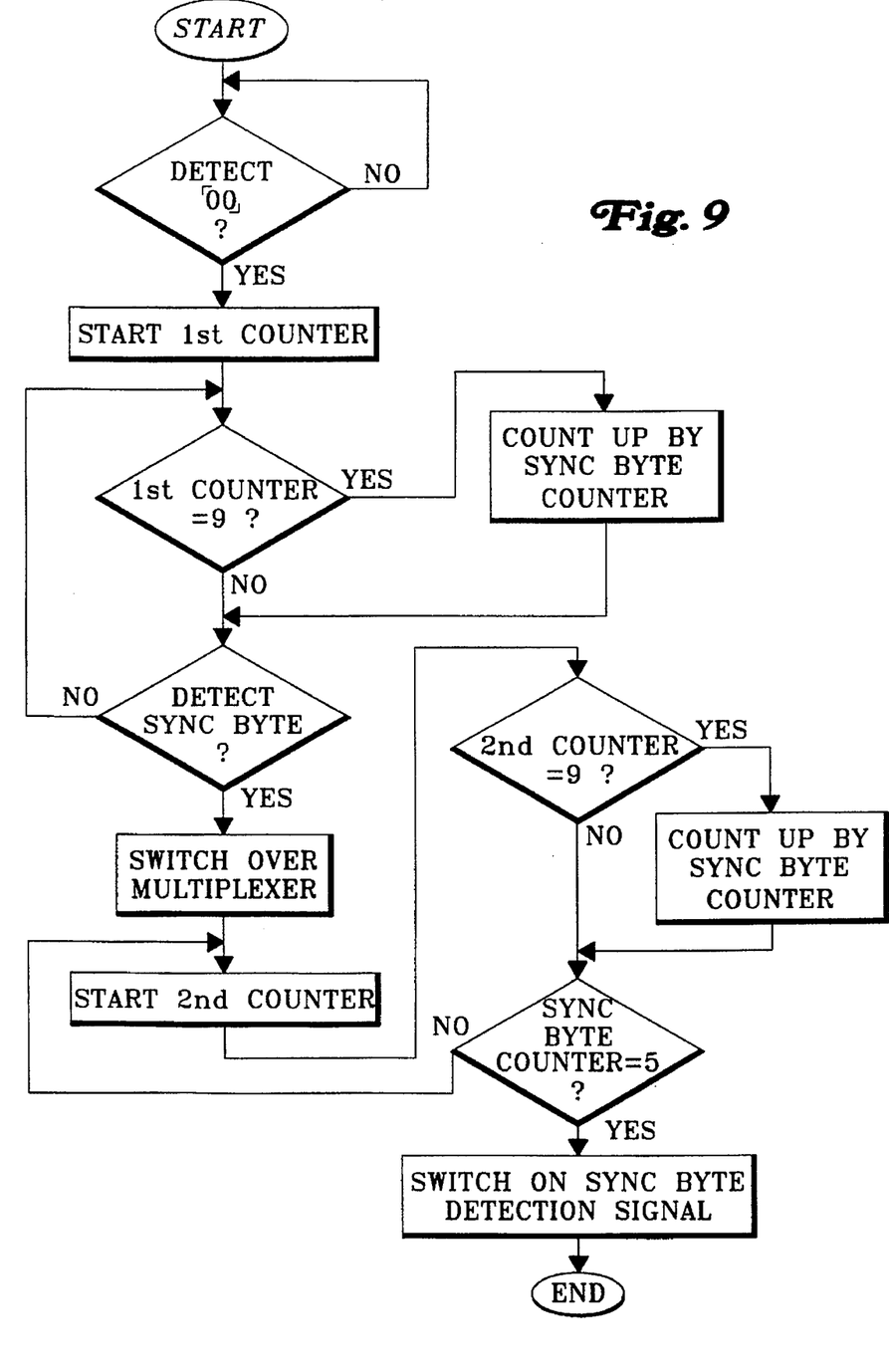
FIG. 9 is a time chart in a construction of FIG. 8.

FIG. 8 is a circuit diagram of the synchronism detection circuit in another embodiment of the present invention. FIG. 9 is a flowchart showing the operation thereof.

As illustrated in FIG. 8, a [00] detection circuit 20 detects that the data [0] in read data from the Viterbi decoder 5 continues by two. An S-R flip-flop 21, in which the detection output of the [00] detection circuit 20 is set, generates a counter start signal.

A first counter 22 counts clocks synchronizing with the read data by use of the counter start signal. The first counter 22 is constructed of a 9-bit counter. Then, the first counter 22 counts up by 1 each time the read data is inputted bitwise. The first counter 22, when a value becomes [9], outputs a count-9 pulse. Further, the first counter 22, with a next clock input, restarts counting up when the value returns to [1].

A shift register 23 is constructed of a 9-bit shift register for storing the read data. A compare circuit 24 compares a content of the shift register 23 with a 9-bit training pattern [111001100] utilized as a sync byte. The compare circuit 24, when detecting a comparative coincidence, outputs a counter start signal to a second counter 26 which will be mentioned later.

An S-R flip-flop 25 is set by a comparative coincidence output of the compare circuit 24 and generates a multiplexer switching signal. A second counter 26 counts the clocks synchronizing with the read data by use of the counter start signal. The second counter 26 is constructed of the 9-bit counter. Then, the second counter 26 counts up by 1 each time the read data is inputted bitwise. The second counter 26, when the value becomes [9], outputs the count-9 pulses. Further, the second counter 26, with the next clock input, restarts counting up when the value returns to [1].

A multiplexer 27 switches over and then outputs the count-9 pulse of the first counter 22 and the count-9 pulse of the second counter 26 in accordance with the multiplexer switching signal.

A sync byte counter (a third counter) 28 counts the pulse outputs from the multiplexer 27. The sync byte counter 28, when counting [5] defined as the number of training patterns, generates a carry output (count-5 pulse). An S-R flip-flop 29, in which a sync byte detection set signal (carry signal) from the sync byte counter 28 is set, generates the sync byte detection signal (start-of-decode signal).

Next, the operation of this circuit will be explained with reference to FIG. 9.

The first counter 22 counts up by 1 each time the read data is inputted bitwise. The first counter 22, when the value becomes [9], outputs the count-9 pulse. This counter 22, when detecting such a pattern that the data [0] continues by two in the read data, starts counting from [1] on the assumption that the first training pattern is detected.

The [00] detection circuit 20 detects the pattern in which the data [0] continues by two. The above training pattern has two portions in which the data [0] continues by two, and, hence, even if one of them is not detected due to a data error, the other [00] is detected. Thus, the counter can be started.

The first counter 22, when the count value becomes [9], outputs the count-9 pulse (carry output). With this outputting, the sync byte counter 28 counts up by one.

A counter start is applied to the second counter 26 each time the compare circuit 24 detects that the training pattern [111001100] enters the shift register 23, and the counter value becomes [1]. Accordingly, the second counter 26 performs counting in synchronism with the training pattern and takes a timing at which the sync byte detection signal is switched ON.

In the beginning portion of the training area, the tap coefficient of the equalizer 4 is in the course of being optimized, and hence there is a high possibility in which the read data is incorrect. Accordingly, from the multiplexer, to start with, the first counter 22 outputs the carry (count-9 pulse) by taking the synchronism with the partial pattern of the training pattern. Then, therein, the tap coefficient of the equalizer 4 is optimized. With this processing, the errors in the read data are reduced. In this state, when detecting the training pattern, the multiplexer 27 is switched over to the carry output (count-9 pulse) of the second counter 26.

When done in this manner, even if synchronized after detecting the erroneous training pattern in the beginning portion, the synchronism with new data exhibiting a high reliability can be retaken. For this reason, it is possible to take a timing at which the sync byte detection signal is accurately switched ON.

When detecting the training pattern, there is switched over to the count-9 pulse of the second counter 26 which synchronizes with this training pattern. Hence, the sync byte counter 28, when the frame of the training comes to [5], generates the sync byte detection set signal synchronizing with the last training pattern. A flip-flop 29 is thereby set, and the sync byte detection signal is switched ON.

In this way, the training pattern is utilized as a sync byte, and, therefore, the start-of-decode timing can be detected without specially providing the sync bytes. Further, the detection with a high reliability can be effected because of synchronizing with the last training pattern. Moreover, the detection signal synchronizing with the training pattern is generated in the last frame of the training pattern, and the accurate detection can be therefore conducted.

In addition to the embodiments discussed above, the present invention can be modified as follows.

First, the n/m decoder has been described in the form of the 8/9 decoder, but decoders having other bit numbers may be also employed. Second, the training pattern has been explained as an example of the pattern [111001100], but other patterns including the data [00] may also be utilized. Third, the apparatus has been described in the form of the magnetic disc apparatus, but the present invention is also applicable to a magneto-optic disc apparatus, etc.

The present invention has been discussed so far. The present invention can be, however, modified within the scope of the gist of the prevent invention, and those modifications are not excluded from the scope of the present invention.

As discussed above, there is detected the training pattern for adapting the equalizer to the partial-response characteristic in accordance with the track radius on the storage disc, thus detecting the start-of-decode position. Hence, there is eliminated the necessity for the area for writing the special sync byte. It is therefore possible to prevent a reduction in the data capacity of the storage disc. Further, the training pattern is detected, and hence actualization thereof can be readily attained.

What is claimed is:

1. A partial-response record signal regenerating method of regenerating a record signal of a data area which follows a training area containing a training signal for determining a circuit constant of an equalizing circuit in a disk apparatus, said method comprising the steps of:

Viterbi-decoding the training signal and the record signal being input through the equalizing circuit into a bit output;

converting consecutive m-bits of said Viterbi-decoded bit output into n-bits (m>n);

detecting the training signal from said Viterbi-decoded bit output, said step of detecting the training signal including:

a first step of taking a synchronism with the record signal by starting a count of a first counter by detecting a partial pattern of the training signal; and a second step of retaking said synchronism with the record signal by detecting a plurality of continuous training signals and synchronizing a last training signal among said plurality of continuous training signals, said second step including a step of counting carry signals of said first counter using a third counter till the training signal is detected, a step of counting a carry signal of a second counter which starts counting in accordance with the detection of the training signal using said third counter when detecting the training signal, and a step of indicating the start of the decoding by the carry signal of said third counter in synchronism with said last training signal among said plurality of continuous training signals; and indicating a start of said converting step for the record signal of the data area in response to said detecting of the training signal.

2. A partial-response record signal, regenerating method according to claim 1, wherein said first step is a step of detecting a number of cycles of the training signal by detecting said partial pattern, and said second step is a step of outputting a signal, said signal outputted when said detected number of cycles indicates a last cycle of the training signal, said signal indicating a start of the decoding in accordance with the fact that the training signal is detected.

3. A partial-response record signal regenerating method of regenerating a record signal of a data area which follows a training area containing a training signal for determining a circuit constant of an equalizing circuit in a disk apparatus, said method comprising the steps of:

Viterbi-decoding the training signal and the record signal being input through the equalizing circuit into a bit output;

converting consecutive m-bits of said Viterbi-decoded bit output into n-bits (m>n);

detecting the training signal from said Viterbi-decoded bit output, said step of detecting the training signal including:

a first step of taking a synchronism with the record signal by starting a count of a first counter by detecting two pieces of continuous data of the training signal, and a second step of retaking said synchronism with the record signal by detecting a plurality of continuous training signals and synchronizing said last training signal among said plurality of continuous training signals, said second step including a step of counting a carry signal of said first counter using a third counter till the training signal is detected, a step of counting a carry signal of a second counter which starts counting in accordance with the detection of the training signal using said third counter when detecting the training signal, and a step of indicating the start of the decoding by the carry signal of said third counter in synchronism with said last training signal among said plurality of continuous training signals; and indicating a start of said converting step for the record signal of the data area in response to the detecting of the training signal.

4. A partial-response record signal regenerating method according to claim 3, wherein said first step is a step of detecting a number of cycles of the training signal by detecting said two pieces of continuous data, and said second step is a step of outputting a signal, said signal outputted when said detected number of cycles indicates a last cycle of the training signal, said signal indicating a start of the decoding in accordance with the fact that the training signal is detected.

5. A partial-response record signal regenerating apparatus for regenerating a partial-response record signal, said apparatus comprising:

an equalizing circuit for equalizing the record signal using a circuit constant determined by a training signal contained in a training area in front of a data area on the storage disc;

a Viterbi decode circuit for Viterbi-decoding said training signal and the record signal being input through said equalizing circuit into a bit output;

a decoder for converting consecutive m-bits of said Viterbi-decoded bit output into n-bits (m>n); and a detecting circuit for indicating a start of converting said m-bits into n-bits by said decoder by detecting said training signal from said Viterbi-decoded bit output, said detecting circuit indicating a start of said converting said m-bits into n-bits in synchronism with a last training signal among a plurality of continuous training signals, wherein said detecting circuit includes:

a circuit for detecting a partial pattern of said training signal;

a first counter for starting a count in accordance with said detection of said partial pattern;

a second counter for starting a count in accordance with said detection of said training signal; and a third counter for counting carry signals of said first counter until said training signal is detected and indicating said start of said decoding by counting said carry signals of said second counter when detecting said partial pattern of said training signal.

6. A partial-response record signal regenerating apparatus according to claim 5, wherein said detecting circuit includes:

a circuit for detecting a number of cycles of said training signal by detecting said partial pattern;

a circuit for detecting said training signal; and a circuit for outputting a signal, said signal outputted when said detected number of cycles indicates a last cycle of said training signal, said signal indicating said start of said decoding in accordance with the fact that said training signal is detected.

7. A partial-response record signal regenerating apparatus for regenerating a partial-response record signal, said apparatus comprising:

an equalizing circuit for equalizing the record signal using a circuit constant determined by a training signal contained in a training area in front of a data area on the storage disc;

a Viterbi decode circuit for Viterbi-decoding said training signal and the record signal being input through said equalizing circuit into a bit output;

a decoder for converting consecutive m-bits of said Viterbi-decoded bit output into n-bits (m>n); and a detecting circuit for indicating a start of converting said m-bits into n-bits by said decoder, said detecting circuit taking a synchronism with the record signal by detecting a partial pattern of said training signal from said Viterbi-decoded bit output, thereafter retaking said synchronism with the record signal by detecting a plurality of continuous training signals and indicating said start of said converting said m-bits into n-bits in synchronism with a last training signal among said plurality of continuous training signals, wherein said detecting circuit includes:

a circuit for detecting said partial pattern of said training signal;

a first counter for starting a count in accordance with said detection of said partial pattern;

a second counter for starting a count in accordance with said detection of said partial pattern; and a third counter for counting carry signals of said first counter until said training signal is detected and indicating said start of said decoding by counting said carry signals of said second counter when detecting said partial pattern of said training signal.

8. A partial-response record signal regenerating apparatus according to claim 7, wherein said detecting circuit includes:

a circuit for detecting a number of cycles of said training signal by detecting said partial pattern of said training signal;

a circuit for detecting said training signal; and a circuit for outputting, when said detected number of cycles indicates a last cycle of said training signal, a signal indicating said start of said decoding in accordance with the fact that said training signal is detected.

9. A partial-response record signal regenerating apparatus according to claim 7, wherein said detecting circuit has a circuit for detecting two pieces of data of said training signal.

* * * * *